United States Patent
Gao et al.

(10) Patent No.: US 11,300,419 B2
(45) Date of Patent: Apr. 12, 2022

(54) PICK-UP/DROP-OFF ZONE AVAILABILITY ESTIMATION USING PROBABILISTIC MODEL

(71) Applicant: Uber Technologies, Inc., San Francisco, CA (US)

(72) Inventors: Shenglong Gao, San Francisco, CA (US); Brent Goldman, San Francisco, CA (US); Konrad Julian Niemiec, Mountain View, CA (US); Michael Voznesensky, San Francisco, CA (US)

(73) Assignee: Uber Technologies, Inc., San Francisco, CA (US)

( * ) Notice: Subject to any disclaimer, the term of this patent is extended or adjusted under 35 U.S.C. 154(b) by 399 days.

(21) Appl. No.: 16/514,933

(22) Filed: Jul. 17, 2019

(65) Prior Publication Data

US 2020/0240798 A1 Jul. 30, 2020

Related U.S. Application Data

(60) Provisional application No. 62/829,340, filed on Apr. 4, 2019, provisional application No. 62/796,895, filed on Jan. 25, 2019.

(51) Int. Cl.
*G01C 21/34* (2006.01)
*G05D 1/00* (2006.01)
*G06N 7/00* (2006.01)
*G05D 1/02* (2020.01)

(52) U.S. Cl.
CPC ....... *G01C 21/3438* (2013.01); *G05D 1/0088* (2013.01); *G05D 1/0221* (2013.01); *G06N 7/005* (2013.01); *G05D 2201/0213* (2013.01)

(58) Field of Classification Search
CPC ............. G01C 21/3438; G05D 1/0088; G05D 1/0221; G05D 2201/0213; G06N 7/005
See application file for complete search history.

(56) References Cited

U.S. PATENT DOCUMENTS

| | | | |
|---|---|---|---|
| 10,242,347 B1 * | 3/2019 | Natarajan | G06Q 30/0601 |
| 10,303,171 B1 * | 5/2019 | Brady | G08G 1/207 |
| 10,467,579 B1 * | 11/2019 | Reiss | G08G 1/20 |
| 2004/0210621 A1 * | 10/2004 | Antonellis | G06Q 10/087 |
| | | | 709/200 |
| 2015/0324944 A1 * | 11/2015 | Lord | G01C 21/3438 |
| | | | 705/7.13 |
| 2017/0154347 A1 * | 6/2017 | Bateman | G06Q 40/08 |
| 2018/0224866 A1 * | 8/2018 | Alonso-Mora | G06N 5/04 |
| 2019/0043001 A1 * | 2/2019 | Woulfe | G06Q 10/083 |

FOREIGN PATENT DOCUMENTS

WO  WO-2018005663 A1 *  1/2018  ............. G06Q 50/30

\* cited by examiner

*Primary Examiner* — Calvin Cheung
(74) *Attorney, Agent, or Firm* — Schwegman Lundberg & Woessner, P.A.

(57) ABSTRACT

Aspects of the present disclosure include systems, methods, and devices to provide estimations of vehicular pick-up/drop-off zone (PDZ) availability. A request for vehicular PDZ availability at a location is received from a vehicular autonomy system of a vehicle. The request specifies an estimated time of arrival at the location. The PDZ availability at the location at the estimated time of arrival is estimated using a probabilistic model. A response to the request is generated based on the estimated PDZ availability. The response indicates the estimated PDZ availability. The response is transmitted to the vehicular autonomy system responsive to the request.

20 Claims, 8 Drawing Sheets

US 11,300,419 B2

PICK-UP/DROP-OFF ZONE AVAILABILITY ESTIMATION USING PROBABILISTIC MODEL

CLAIM FOR PRIORITY

This application claims the benefit of priority of U.S. Provisional Application No. 62/829,340, filed Apr. 4, 2019 and U.S. Provisional Application No. 62/796,895, filed Jan. 25, 2019, the benefit of priority of each of which is hereby claimed herein, and which applications are hereby incorporated herein by reference in their entireties.

TECHNICAL FIELD

The subject matter disclosed herein relates to autonomous vehicles (AVs). In particular, example embodiments may relate to devices, systems, and methods for operating an autonomous vehicle.

BACKGROUND

An AV is a vehicle that is capable of sensing its environment and operating some or all of the vehicle's controls based on the sensed environment. An AV includes sensors that capture signals describing the environment surrounding the vehicle. The AV processes the captured sensor signals to comprehend the environment and automatically operates some or all of the vehicle's controls based on the resulting information.

BRIEF DESCRIPTION OF THE DRAWINGS

Various ones of the appended drawings merely illustrate example embodiments of the present inventive subject matter and cannot be considered as limiting its scope.

DETAILED DESCRIPTION

Figure 1:
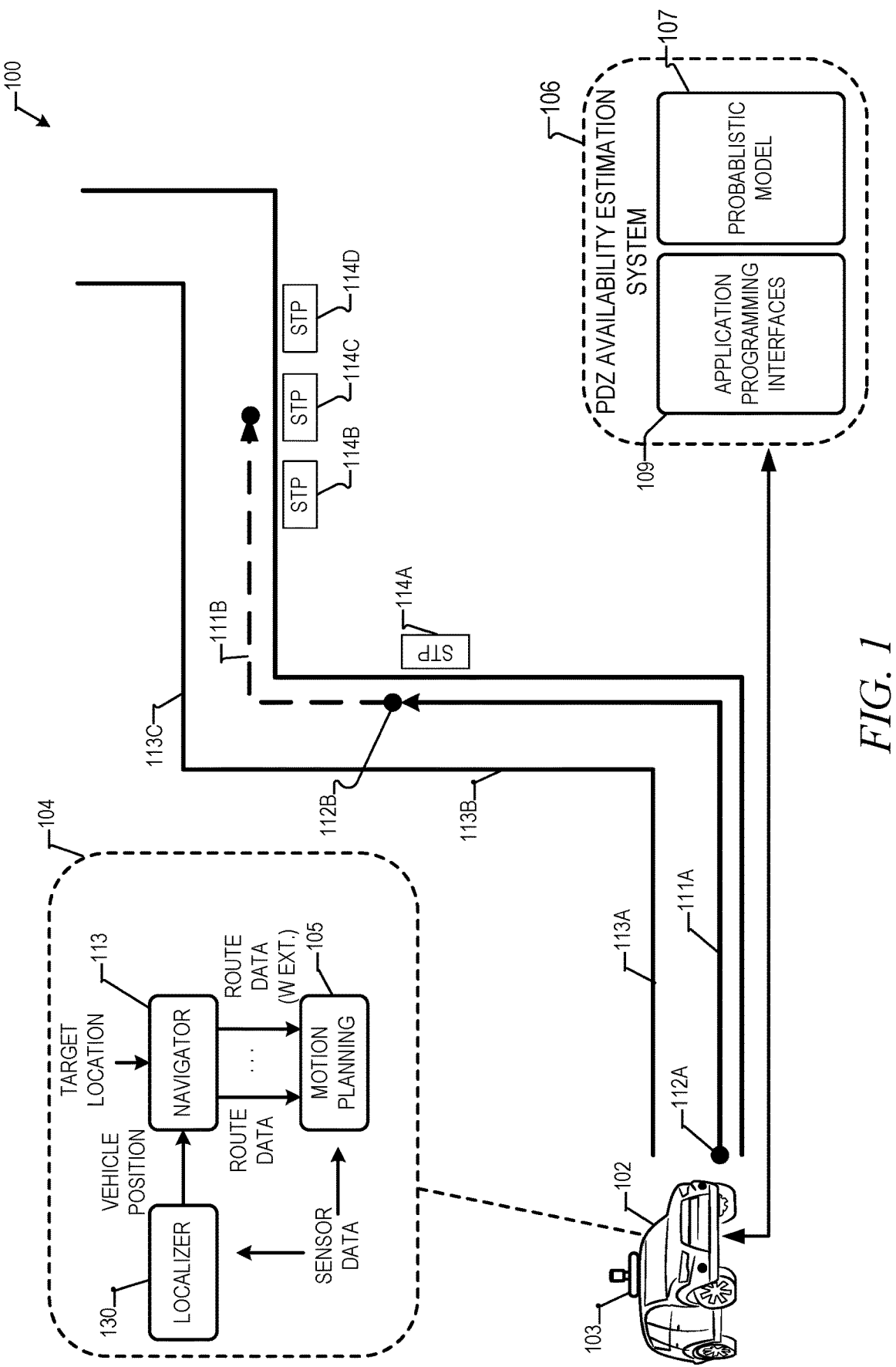
FIG. 1 is a block diagram illustrating an example environment for vehicle routing based on pick-up/drop off zone (PDZ) availability estimation, according to some embodiments.

Reference will now be made in detail to specific example embodiments for carrying out the inventive subject matter. Examples of these specific embodiments are illustrated in the accompanying drawings, and specific details are set forth in the following description in order to provide a thorough understanding of the subject matter. It will be understood that these examples are not intended to limit the scope of the claims to the illustrated embodiments. On the contrary, they are intended to cover such alternatives, modifications, and equivalents as may be included within the scope of the disclosure.

In an autonomous or semi-autonomous vehicle (collectively referred to as an AV or a self-driving vehicle (SDV)), a vehicle autonomy system controls one or more of braking, steering, or throttle of the vehicle. A vehicle autonomy system can control an autonomous vehicle along a route to a target location. A route is a path that the autonomous vehicle takes, or plans to take, over one or more roadways. In some examples, the target location of a route is associated with one or more PDZs. A PDZ is a location where the autonomous vehicle can legally stop, for example, to pick-up or drop-off one or more passengers, pick-up or drop-off one or more pieces of cargo, recharge, download new data, wait for further service request, wait for other autonomous vehicles or otherwise pull over safely. In some examples, the autonomous vehicle can be used to provide a ride service for passengers. A PDZ can be a place where the autonomous vehicle can pick-up or drop-off a passenger. In other examples, the autonomous vehicle can be used to provide a delivery service of food or other purchased items. A PDZ can be a place where the autonomous vehicle parks to pick up an item or items for delivery or a place where the autonomous vehicle can make a delivery of an item or items to a customer. Non-limiting examples of PDZs include parking spots, driveways, roadway shoulders, and loading docks.

A PDZ can be available for stopping or unavailable for stopping. A PDZ is available for stopping if there is space at the PDZ for the vehicle to stop and pick-up or drop-off a passenger, cargo, or item. For example, a single-vehicle parking spot is available for stopping if no other vehicle is present. A roadway shoulder location is available for stopping if there is an unoccupied portion of the roadway shoulder that is large enough to accommodate the AV. In many applications, the vehicle autonomy system does not know if a particular PDZ is available until the PDZ is within the range of the AV's sensors. If a first PDZ is unavailable, the AV can wait until the first PDZ is available or, for example, move on to a next PDZ associated with the route target location. If all PDZs associated with a target location are unavailable, the vehicle autonomy system may generate a new route that passes one or more additional PDZs. In any event, locating an available PDZ is a complex and challenging problem for AVs that can needlessly consume time that could otherwise be spent providing additional ride or delivery services.

Aspects of the present disclosure address the forgoing issues with finding available PDZs, among others, with systems, methods, and devices to generate and utilize a probabilistic model of PDZ availability. The probabilistic model may be used to estimate a likelihood that a given PDZ is available. The probabilistic model may be used to generate an AV route that brings the AV near the PDZ that is most likely to be available.

Consistent with some embodiments, a probabilistic model of PDZ availability may be trained, in an offline process, using historical data that includes any one or more of: user-generated information (e.g., user generated reports of an occupied or unoccupied PDZ); vehicle driving logs; vehicular sensor logs (e.g., comprising image sensor data, Radar data, Lidar data, etc.); traffic information; public transit schedules; parking restrictions; global position system (GPS) data from one or more vehicles (e.g., known location of one or more stopped vehicles); and parking spot occupancy data obtained from parking meters or other parking sensors. Accordingly, obtaining the historical data may include any one or more of: providing a prompt on a mobile computing device (e.g., via an application or push notifications) to confirm occupancy of a particular PDZ; obtaining a vehicle driving log; obtaining a vehicular sensor log; accessing real-time or historical traffic data; accessing a public transit schedule; accessing information related to parking restrictions; obtaining GPS data from a vehicle autonomy system; and obtaining parking spot occupancy data from a parking meter or sensor. The historical data is analyzed to compute a probabilistic estimation of PDZ availability based on identified features (e.g., patterns) in the data. The training of the probabilistic estimation may include applying one of many known machine learning algorithms to the historical data.

The probabilistic model may be routinely refined, in an offline process, based on new information that provides an indication of PDZ availability. For example, the probabilistic model may be updated in real-time or near real-time as the new information is generated or obtained, or the probabilistic model may be periodically updated (e.g., nightly) using batches of new information. In some embodiments, the updating of the probabilistic model may include routing a vehicle near a PDZ to determine whether the PDZ is occupied, for example, based on sensor data from the vehicle and/or user-generated information from a human occupant of the vehicle. Consistent with these embodiments, a prompt may be provided on a display of a mobile computing device (e.g., via an application or push notifications) to confirm occupancy of a particular PDZ.

Consistent with some embodiments, a network-based system (e.g., comprising one or more server computers) may host the probabilistic model and expose one or more application programming interfaces (APIs) that facilitate interaction with the probabilistic model by internal and external systems and services. The system may expose a first API that allows vehicle autonomy systems and other network-based systems and services (both first or third party) to submit data to be used in refining the probabilistic model. As noted above, such data may include an indication of PDZ availability (e.g., an indication that a PDZ is occupied or unoccupied).

The system may expose a second API that allows vehicle autonomy systems and other network-based systems and services (first or third party) to query the probabilistic model for estimations of PDZ availability. For example, a vehicle autonomy system or other network-based system or service may submit, via the second API, a request for an estimate of PDZ availability near a location at a particular time. In response to the request, the system may transmit a reply to the requestor, via the second API, that includes an indication of a likelihood that a PDZ is available near the target location at the particular time determined based on the probabilistic model. The response may further specify a particular PDZ or list of PDZ near the target location along with a corresponding likelihood of availability. In instances in which the response specifies a particular PDZ, the system may select the PDZ based on the likelihood of availability. In some instances, the system may select the PDZ having the highest likelihood of availability while in other instances the system may select a PDZ with a lower likelihood of availability if, for example, the PDZ is part of a cluster of proximate PDZs with similar availability likelihoods.

The second API may, for example, be utilized by a vehicle autonomy system in route planning for an AV. In particular, a vehicle autonomy system may utilize the likelihood of PDZ availability provided by the probabilistic model in generating or refining a route for the AV. For example, upon querying the probabilistic model to obtain a likelihood of availability of a PDZ near a target location and receiving a response that indicates a low likelihood of availability for the PDZ(s) nearest to the target location, the vehicle autonomy system may generate a new route that passes one or more additional PDZs indicated as having a higher likelihood of availability.

With reference to FIG. 1, an example environment 100 for vehicle routing based on PDZ availability estimation is illustrated, according to some embodiments. The environment 100 includes a vehicle 102. The vehicle 102 can be a passenger vehicle such as a car, a truck, a bus, or other similar vehicle. The vehicle 102 can also be a delivery vehicle, such as a van, a truck, a tractor trailer, and so forth. The vehicle 102 is an SDV or AV that includes a vehicle autonomy system configured to operate some or all of the controls of the vehicle (e.g., acceleration, braking, steering). As an example, as shown, the vehicle 102 includes a vehicle autonomy system 104.

In some examples, the vehicle autonomy system 104 is operable in different modes, where the vehicle autonomy system 104 has differing levels of control over the vehicle 102 in different modes. In some examples, the vehicle autonomy system 104 is operable in a full autonomous mode in which the vehicle autonomy system 104 has responsibility for all or most of the controls of the vehicle 102. In addition to or instead of the full autonomous mode, the vehicle autonomy system 104, in some examples, is operable in a semi-autonomous mode in which a human user or driver is responsible for some or all of the control of the vehicle 102. Additional details of an example vehicle autonomy system are provided in FIG. 2.

The vehicle 102 has one or more remote-detection sensors 103 that receive return signals from the environment 100. Return signals may be reflected from objects in the environment 100, such as the ground, buildings, trees, and so forth. The remote-detection sensors 103 may include one or more active sensors, such as LIDAR, RADAR, and/or SONAR, that emit sound or electromagnetic radiation in the form of light or radio waves to generate return signals. The remote-detection sensors 103 can also include one or more passive sensors, such as cameras or other imaging sensors, proximity sensors, and so forth, that receive return signals that originated from other sources of sound or electromagnetic radiation. Information about the environment 100 is extracted from the return signals. In some examples, the remote-detection sensors 103 include one or more passive sensors that receive reflected ambient light or other radiation, such as a set of monoscopic or stereoscopic cameras. Remote-detection sensors 103 provide remote sensor data that describes the environment 100. The vehicles 102 can also include other types of sensors, for example, as described in more detail with respect to FIG. 2.

As an example of the operation of the vehicle autonomy system 104, the system 104 generates a route 111A for the vehicle 102 extending from a starting location 112A to a target location 112B. The starting location 112A can be a current vehicle position and/or a position to which the vehicle 102 will travel to begin the route 111A. The route 111A describes a path of travel over one or more roadways including, for example, turns from one roadway to another, exits on or off a roadway, and so forth. In some examples, the route 111A also specifies lanes of travel, for example, on roadways having more than one lane of travel. In this example, the initial route 111A extends along roadways 113A and 113B although, in various examples, routes extend over more or fewer than two roadways.

The environment 100 also includes a PDZ availability estimation system 106 that uses a probabilistic model 107 to provide estimates of PDZ availability. Each PDZ availability estimation indicates a likelihood that a PDZ associated with a location will be available at a particular time. The probabilistic model 107 may be trained in an offline process to provide estimates of PDZ availability based on historical data comprising indicia of PDZ availability. The probabilistic model 107 may be trained with the historical data using any one of many known machine learning techniques to recognize certain patterns that provide an indication of whether a PDZ is occupied (i.e., available) or unoccupied (i.e., unavailable).

The PDZ availability estimation system 106 comprises one or more computer server systems configured to exchange data, over a wireless network, with the vehicle autonomy system 105 of the vehicles 102. The data exchanged between the PDZ availability estimation system 106 and the vehicular autonomy system 104 may include requests for PDZ availability, responses to PDZ availability requests, and information used to train or update the probabilistic model 107. To this end, the PDZ availability estimation system 106 exposes various APIs 109 to the vehicular autonomy system.

As an example, the PDZ availability estimation system 106 may expose a first API that allows the vehicle autonomy system 104 and other network-based systems and services (both first or third party) to submit information to be used in refining the probabilistic model. This information includes one or more indicia of PDZ availability such as sensor data, user generated reports of PDZ availability, or machine generated reports of PDZ availability.

As another example, the PDZ availability estimation system 106 may expose a second API that allows the vehicle autonomy system 104 and other network-based systems and services (first or third party) to submit requests for PDZ availability estimations. For example, the vehicular autonomy system 104 may submit a request for an availability estimation for PDZs associated with the target location 112*b*. The request may include an estimated time of arrival of the vehicle 102 at the target location 112*b* (e.g., determined based on the route 111AA).

As shown in FIG. 1, the target location 112B is associated with stopping locations 114A, 114B, 114C, and 114D. For example, where the target location 112B of the vehicle 102 is at or near a city block, the stopping locations 114A, 114B, 114C, and 114D can be a shoulder or curb-side area on the city block where the vehicle 102 can pull-over. The stopping locations 114A, 114B, 114C, and 114D may be associated with the target location 112B of the vehicle 102 based on being within a threshold distance of the target location 112B. In some examples, the stopping locations 114A, 114B, 114C, and 114D are associated with the target location 112B based on the direction of travel of the vehicle 102. For example, in the United States, where traffic travels on the right-hand side of the roadway, stopping locations on the right-hand shoulder of the roadway relative to the vehicle 102 are associated with a target location, such as 112B, while stopping locations on the left-hand shoulder of the roadway may not be, as it may not be desirable for the vehicle 102 to cross traffic to reach the left-hand shoulder of the roadway.

Upon receiving the request for PDZ availability estimation, the PDZ availability estimation system 106 uses the probabilistic model 107 to estimate a likelihood that a PDZ associated with the target location 112B (e.g., stopping locations 114A, 114B, 114C, and 114D) will be available at the estimated time of arrival of the vehicle 102 at the target location 112B. In estimating the likelihood that a PDZ associated with the target location 112B will be available at the estimated time of arrival, the PDZ availability estimation system 106 uses the probabilistic model 107 to individually estimate a likelihood that each of the stopping locations 114A, 114B, 114C, and 114D will be available for stopping at the estimated time of arrival of the vehicle 102. The PDZ availability estimation system 106 generates a response to the request based on the estimate of PDZ availability and transmits the response to the vehicular autonomy system 104 responsive to the request. The response may include a value indicating a likelihood that a PDZ associated with the target location 112B (e.g., stopping locations 114A, 114B, 114C, and 114D) will be available at the estimated time of arrival of the vehicle 102 at the target location 112B and may further include the individual estimates of availability for the stopping locations 114A, 114B, 114C, and 114D.

In some embodiments, the response may further include a target PDZ selected from the stopping locations 114A, 114B, 114C, and 114D. For example, the PDZ availability estimation system 106 may select one of the stopping locations 114A, 114B, 114C, and 114D as the target PDZ based on the individual likelihoods of each stopping location being available at the estimated time of arrival of the vehicle 102. In some instances, the system may select the PDZ having the highest likelihood of availability while in other instances the system may select a PDZ with a lower likelihood of availability if, for example, the PDZ is part of a cluster of proximate PDZs with similar availability likelihoods. For example, although the stopping location 114A may have the highest likelihood of being available at the estimated time of arrival of the vehicle 102, the PDZ availability estimation system 106 may select stopping location 114C as the target PDZ based on its proximity to stopping locations 114B and 114D, which have a similar likelihood of being available as the stopping location 114C, thereby increasing the likelihood that the vehicle 102 will be able to claim an available PDZ.

The vehicle autonomy system 104 controls the vehicle 102 along the route 111A towards the target location 112B. For example, the vehicle autonomy system 104 controls one or more of the steering, braking, and acceleration of the vehicle 102 to direct the vehicle 102 along the roadway according to the route 111A. Upon receiving the response from PDZ availability estimation system 106, the vehicle autonomy system 104 may refine the route 111A or generate a new route based on the PDZ availability estimate. In a first example, based on the response identifying the stopping location 114C as the target PDZ, the vehicle autonomy system 104 may generate a route extension 111B that extends from the target location 112B to the stopping location 114C. In this example, the route extension 111B traverses the roadway 113B and roadway 113C with a right turn from the roadway 113B to the roadway 113C. In a second example, despite the response identifying the stopping location 114C as the target PDZ, the vehicle autonomy system 104 may instead select stopping location 114D as the target PDZ, and generate a route extension 111B that extends from the target location 112B to the stopping location 114D. In either example, if the vehicle autonomy system 104 is assigned to the target location 112B for the purpose of picking up a passenger, the passenger may be notified of the target PDZ to which the vehicle 102 is traveling and may further be provided a route or directions from the target location 112B to the target PDZ.

In some examples, the vehicle autonomy system 104 separates the process of stopping the vehicle 102 at a stopping location from generating routes and/or route extensions. For example, the vehicle autonomy system 104 of FIG. 1 includes a localizer system 130, a navigator system 113, and a motion planning system 105. The navigator system 113 is configured to generate routes, including route extensions. The motion planning system 105 is configured to determine whether stopping locations associated with a target location are available and cause the vehicle to stop at a stopping location that is available. The navigator system 113 continues to generate route extensions, as described herein, until the motion planning system 105 causes the vehicle 102 to stop at a stopping location.

The localizer system 130 can receive sensor data from remote detection sensors 103 (and/or other sensors) to generate a vehicle position. In some examples, the localizer system 130 generates a vehicle pose including the vehicle position and vehicle attitude, described in more detail herein. The vehicle position generated by the localizer system 130 is provided to the navigator system 113. The navigator system 113 also receives and/or accesses target location data describing the vehicle's target location. The target location data can be received from a user, from PDZ availability estimation system 106, from another component of the vehicle autonomy system 104, and/or from another suitable source. In some embodiments, the navigator system 113 uses the target location data and the vehicle position to generate route data describing the route 111A and route extension 111B. In some embodiments, at least a portion of the route data (e.g., the portion describing the route extension 111B) may be provided by the PDZ availability estimation system 106 with the response to the PDZ availability estimation request. The route data can include an indication of the route 111A and of stopping location 114C. The route data is provided to the motion planning system 105.

The motion planning system 105 uses the route data to control the vehicle 102 along the route 111A and route extension 111B. For example, the motion planning system 105 sends control commands to the throttle, steering, brakes, and/or other controls of the vehicle 102 to cause the vehicle 102 to traverse the route 111A. The motion planning system 105 is programmed to stop the vehicle 102 if the vehicle 102 approaches stopping location 114. The navigator system 113 continues to generate route data describing routes, for example, until the motion planning system 105 successfully stops the vehicle 102 at the stopping location 114C.

Figure 2:
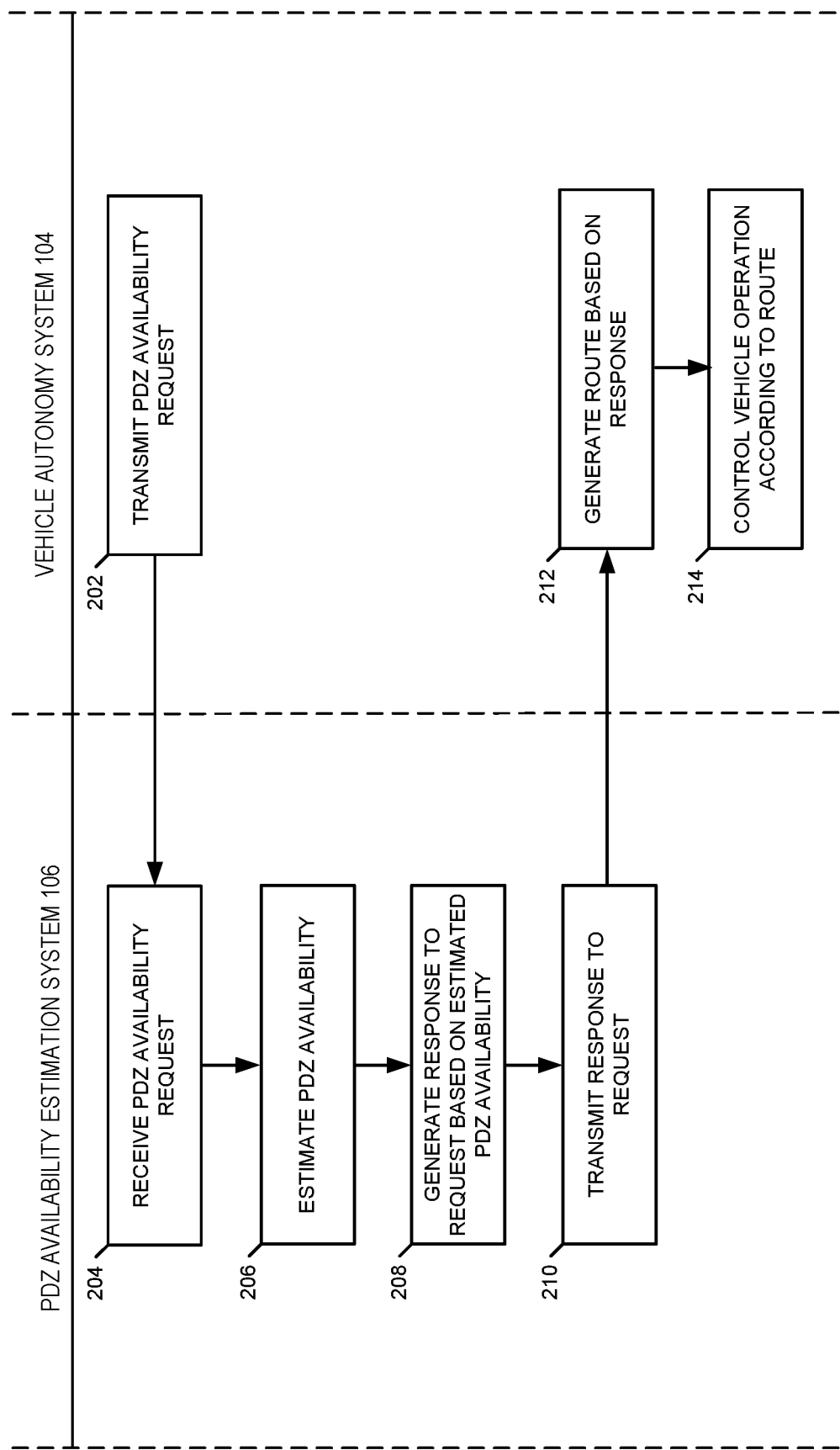
FIG. 2 is an interaction diagram depicting exchanges between a PDZ availability estimation system and a vehicular autonomy system in performing a method of vehicle routing based on PDZ availability estimation, according to some embodiments.

FIG. 2 is an interaction diagram depicting exchanges between a PDZ availability estimation system and a vehicular autonomy system in performing a method of vehicle routing based on PDZ availability estimation, according to some embodiments. As shown in FIG. 2, the method 200 begins at operation 202, where the vehicle autonomy system 104 transmits, via one of the APIs 109, a PDZ availability request to the PDZ availability estimation system 106. The request specifies a location. The location may, for example, be a target location of the vehicle autonomy system 104.

At operation 204, the PDZ availability estimation system 106 receives the request and uses the probabilistic model 107 to estimate PDZ availability at the request location (at operation 206). The estimate of PDZ availability comprises a value that indicates probability that a PDZ associated with the location is available. In estimating the PDZ availability at the request location, the PDZ availability estimation system 106 may identify a set of PDZs associated with the location (e.g., based on distance between each PDZ and the location satisfying a threshold distance criteria) and estimate an availability of the set of PDZs. The availability of the set of PDZs may be based on individual estimates of availability for each PDZ in the set. For example, the PDZ availability estimated by the PDZ availability estimation system 106 may comprise an availability of a PDZ in the set of PDZ associated with the location having the highest likelihood of availability.

At operation 208, the PDZ availability estimation system 106 generates a response to the request based on the estimated PDZ availability. The response includes at least the estimated PDZ availability to indicate a probability that a PDZ associated with the location is available responsive to the request. The generating of the response may include selecting a target PDZ based on individual estimates of availability of each PDZ associated with the location. Accordingly, the response may include a target PDZ.

In some embodiments, the generating of the response also includes generating a route to the target PDZ. In some embodiments, the generating of the response further includes generating a set of instructions or a command that causes the vehicle autonomy system 104 to operate a vehicle such that the vehicle travels to the target PDZ (e.g., in accordance with a generated route). The PDZ availability estimation system 106 transmits the response to the vehicle autonomy system 104, at operation 210.

At operation 212, the vehicle autonomy system 104 generates a route (or route extension) based on the response. The route may correspond to the target PDZ included in the response or another PDZ selected by the vehicle autonomy system 104. In embodiments in which the response includes a route generated by the PDZ availability estimation system 106, the route generated by the vehicle autonomy system 104 may correspond to the route included in the response. The vehicle autonomy system 104 controls the operation of the vehicle according to the generated route, at operation 214. That is, the vehicle autonomy system 104 controls operations of the vehicle such that the vehicle travels along the generated route (e.g., to the target PDZ). If the vehicle autonomy system 104 is picking up a passenger at the target location, the passenger may be notified of the target PDZ to which the vehicle 102 is traveling and may further be provided a route or directions from the target location to the PDZ. For example, a mobile device of the passenger may be provided with a graphical user interface (GUI) that displays a map on which a route from the target location to the PDZ to which the vehicle autonomy system 104 is routed.

Figure 3:
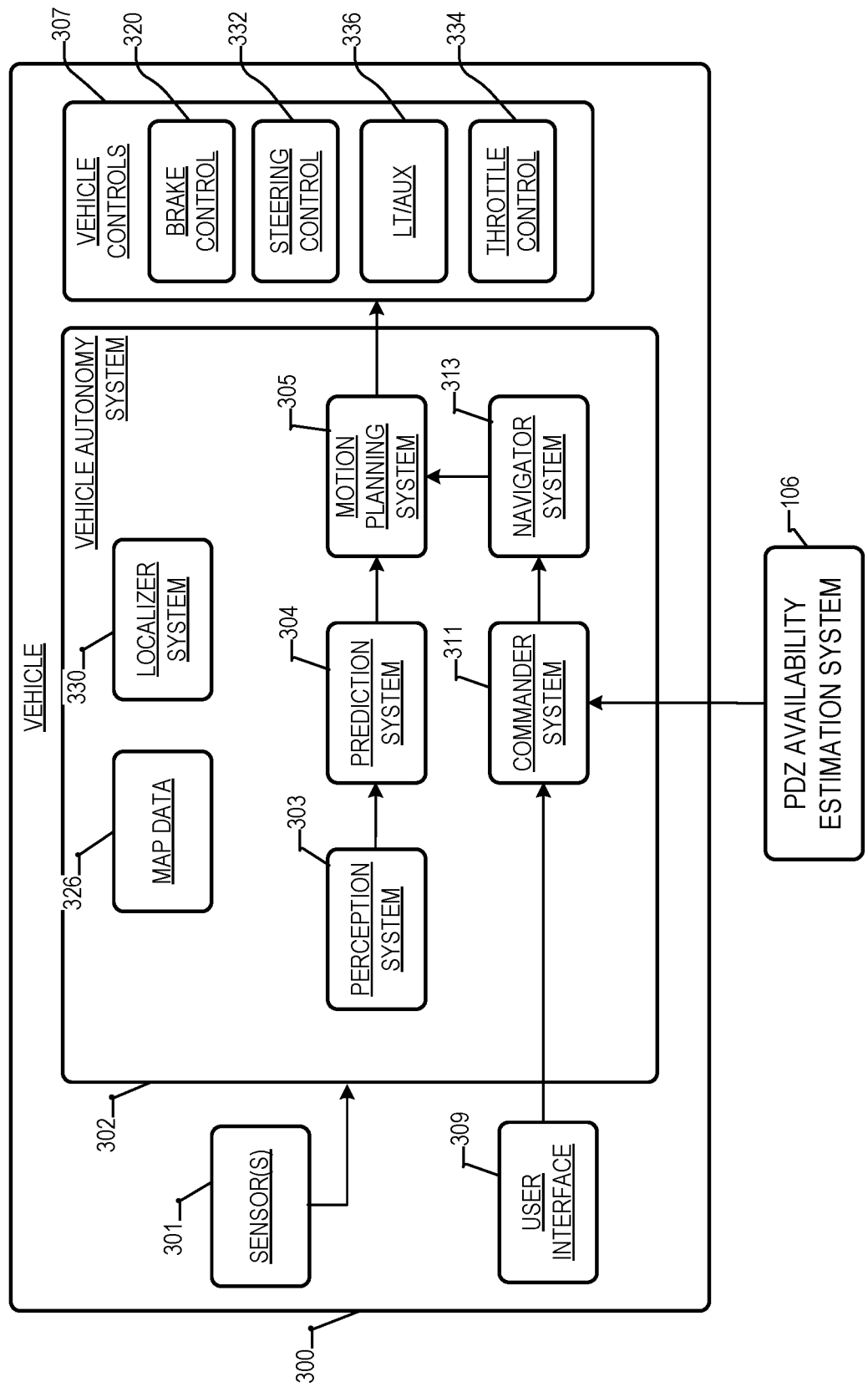
FIG. 3 is a block diagram depicting an example vehicle, according to some embodiments.
Figure 4:
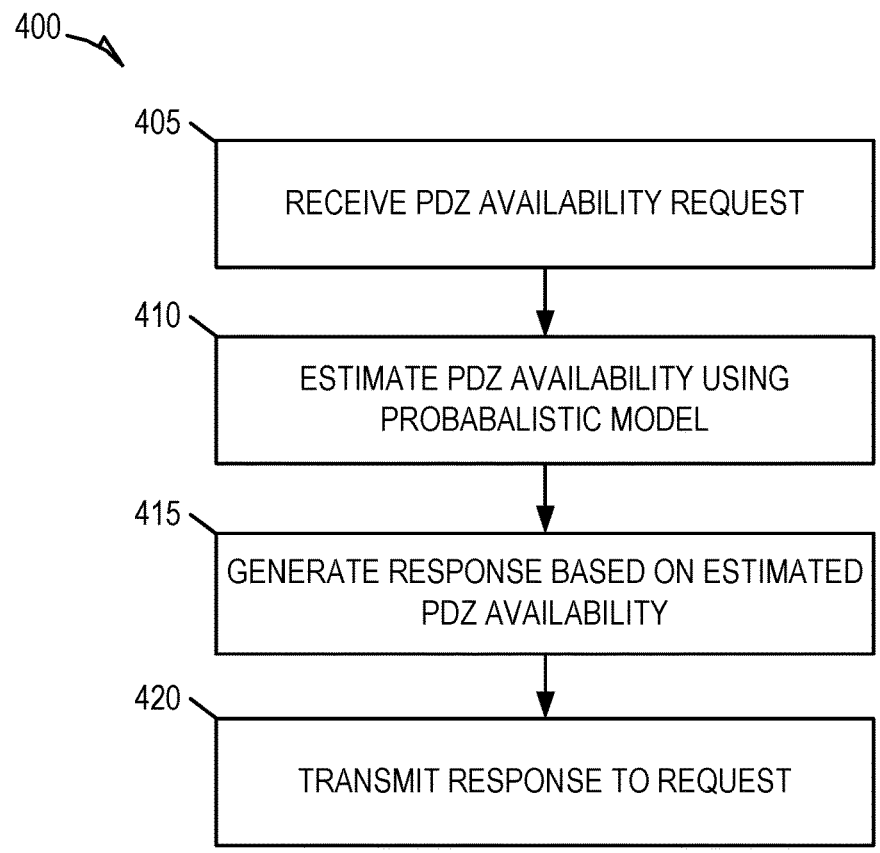
FIGS. 4-7 are flowcharts illustrating example operations of the dispatch system in performing a method for providing PDZ availability estimations, according to some embodiments.

FIG. 3 is a block diagram depicting an example vehicle 300, according to some embodiments. To avoid obscuring the inventive subject matter with unnecessary detail, various functional components that are not germane to conveying an understanding of the inventive subject matter have been omitted from FIG. 3. However, a skilled artisan will readily recognize that various additional functional components may be included as part of the vehicle 300 to facilitate additional functionality that is not specifically described herein.

The vehicle 300 includes one or more sensors 301, a vehicle autonomy system 302, and one or more vehicle controls 307. The vehicle 300 can be an autonomous vehicle, as described herein.

The vehicle autonomy system 302 includes a commander system 311, a navigator system 313, a perception system 303, a prediction system 304, a motion planning system 305, and a localizer system 330 that cooperate to perceive the surrounding environment of the vehicle 300 and determine a motion plan for controlling the motion of the vehicle 300 accordingly.

The vehicle autonomy system 302 is engaged to control the vehicle 300 or to assist in controlling the vehicle 300. In particular, the vehicle autonomy system 302 receives sensor data from the one or more sensors 301, attempts to comprehend the environment surrounding the vehicle 300 by performing various processing techniques on data collected by the sensors 301, and generates an appropriate route through the environment. The vehicle autonomy system 302 sends commands to control the one or more vehicle controls 307 to operate the vehicle 300 according to the route.

Various portions of the vehicle autonomy system 302 receive sensor data from the one or more sensors 301. For example, the sensors 301 may include remote-detection sensors as well as motion sensors such as inertial measurement units (IMUs), one or more encoders, or one or more odometers. The sensor data can include information that describes the location of objects within the surrounding environment of the vehicle 300, information that describes the motion of the vehicle 300, and so forth.

The sensors 301 may also include one or more remote-detection sensors or sensor systems, such as a LIDAR, a RADAR, one or more cameras, and so forth. As one example, a LIDAR system of the one or more sensors 301 generates sensor data (e.g., remote-detection sensor data) that includes the location (e.g., in three-dimensional space relative to the LIDAR system) of a number of points that correspond to objects that have reflected a ranging laser. For example, the LIDAR system can measure distances by measuring the Time of Flight (TOF) that it takes a short laser pulse to travel from the sensor to an object and back, calculating the distance from the known speed of light.

As another example, a RADAR system of the one or more sensors 301 generates sensor data (e.g., remote-detection sensor data) that includes the location (e.g., in three-dimensional space relative to the RADAR system) of a number of points that correspond to objects that have reflected ranging radio waves. For example, radio waves (e.g., pulsed or continuous) transmitted by the RADAR system can reflect off an object and return to a receiver of the RADAR system, giving information about the object's location and speed. Thus, a RADAR system can provide useful information about the current speed of an object.

As yet another example, one or more cameras of the one or more sensors 301 may generate sensor data (e.g., remote sensor data) including still or moving images. Various processing techniques (e.g., range imaging techniques such as, for example, structure from motion, structured light, stereo triangulation, and/or other techniques) can be performed to identify the location (e.g., in three-dimensional space relative to the one or more cameras) of a number of points that correspond to objects that are depicted in an image or images captured by the one or more cameras. Other sensor systems can identify the location of points that correspond to objects as well.

As another example, the one or more sensors 301 can include a positioning system. The positioning system determines a current position of the vehicle 300. The positioning system can be any device or circuitry for analyzing the position of the vehicle 300. For example, the positioning system can determine a position by using one or more of inertial sensors, a satellite positioning system such as a GPS, based on an Internet Protocol (IP) address, by using triangulation and/or proximity to network access points or other network components (e.g., cellular towers, Wi-Fi access points), and/or other suitable techniques. The position of the vehicle 300 can be used by various systems of the vehicle autonomy system 302.

Thus, the one or more sensors 301 can be used to collect sensor data that includes information that describes the location (e.g., in three-dimensional space relative to the vehicle 300) of points that correspond to objects within the surrounding environment of the vehicle 300. In some implementations, the sensors 301 can be positioned at various different locations on the vehicle 300. As an example, in some implementations, one or more cameras and/or LIDAR sensors can be located in a pod or other structure that is mounted on a roof of the vehicle 300 while one or more RADAR sensors can be located in or behind the front and/or rear bumper(s) or body panel(s) of the vehicle 300. As another example, camera(s) can be located at the front or rear bumper(s) of the vehicle 300. Other locations can be used as well.

The localizer system 330 receives some or all of the sensor data from sensors 301 and generates vehicle poses for the vehicle 300. A vehicle pose describes the position and attitude of the vehicle 300. The vehicle pose (or portions thereof) can be used by various other components of the vehicle autonomy system 302 including, for example, the perception system 303, the prediction system 304, the motion planning system 305, and the navigator system 313.

The position of the vehicle 300 is a point in a three-dimensional space. In some examples, the position is described by values for a set of Cartesian coordinates, although any other suitable coordinate system may be used. The attitude of the vehicle 300 generally describes the way in which the vehicle 300 is oriented at its position. In some examples, attitude is described by a yaw about the vertical axis, a pitch about a first horizontal axis, and a roll about a second horizontal axis. In some examples, the localizer system 330 generates vehicle poses periodically (e.g., every second, every half second). The localizer system 330 appends time stamps to vehicle poses, where the time stamp for a pose indicates the point in time that is described by the pose. The localizer system 330 generates vehicle poses by comparing sensor data (e.g., remote sensor data) to map data 326 describing the surrounding environment of the vehicle 300.

In some examples, the localizer system 330 includes one or more pose estimators and a pose filter. Pose estimators generate pose estimates by comparing remote-sensor data (e.g., LIDAR, RADAR) to map data. The pose filter receives pose estimates from the one or more pose estimators as well as other sensor data such as, for example, motion sensor data from an IMU, encoder, or odometer. In some examples, the pose filter executes a Kalman filter or machine learning algorithm to combine pose estimates from the one or more pose estimators with motion sensor data to generate vehicle poses. In some examples, pose estimators generate pose estimates at a frequency less than the frequency at which the localizer system 330 generates vehicle poses. Accordingly, the pose filter generates some vehicle poses by extrapolating from a previous pose estimate utilizing motion sensor data.

Vehicle poses and/or vehicle positions generated by the localizer system 330 can be provided to various other components of the vehicle autonomy system 302. For example, the commander system 311 may utilize a vehicle position to determine whether to respond to a call from a dispatch system.

The commander system 311 determines a set of one or more target locations that are used for routing the vehicle 300. The target locations can be determined based on user input received via a user interface 309 of the vehicle 300. The user interface 309 may include and/or use any suitable input/output device or devices. In some examples, the commander system 311 determines the one or more target locations considering data received from PDZ availability estimation system 106.

PDZ availability estimation system 106 can be programmed to provide information to multiple vehicles, for example, as part of a fleet of vehicles for moving passengers and/or cargo. Data from PDZ availability estimation system 106 can be provided to each vehicle via a wireless network, for example. As will be discussed in further detail below, PDZ availability estimation system 106 is responsible for providing estimates of PDZ availability.

The navigator system 313 receives one or more target locations from the commander system 311 or user interface 309 along with map data 326. Map data 326, for example, may provide detailed information about the surrounding environment of the vehicle 300. Map data 326 can provide information regarding identity and location of different roadways and segments of roadways (e.g., lane segments). A roadway is a place where the vehicle 300 can drive and may include, for example, a road, a street, a highway, a lane, a parking lot, or a driveway.

From the one or more target locations and the map data 326, the navigator system 313 generates route data describing a route for the vehicle to take to arrive at the one or more target locations.

In some implementations, the navigator system 313 determines route data based on applying one or more cost functions and/or reward functions for each of one or more candidate routes for the vehicle 300. For example, a cost function can describe a cost (e.g., a time of travel) of adhering to a particular candidate route while a reward function can describe a reward for adhering to a particular candidate route. For example, the reward can be of an opposite sign to that of cost. Route data is provided to the motion planning system 305, which commands the vehicle controls 307 to implement the route or route extension, as described herein.

The perception system 303 detects objects in the surrounding environment of the vehicle 300 based on sensor data, map data 326, and/or vehicle poses provided by the localizer system 330. For example, map data 326 used by the perception system 303 may describe roadways and segments thereof and may also describe: buildings or other items or objects (e.g., lampposts, crosswalks, curbing); location and directions of traffic lanes or lane segments (e.g., the location and direction of a parking lane, a turning lane, a bicycle lane, or other lanes within a particular roadway); traffic control data (e.g., the location and instructions of signage, traffic lights, or other traffic control devices); and/or any other map data that provides information that assists the vehicle autonomy system 302 in comprehending and perceiving its surrounding environment and its relationship thereto.

In some examples, the perception system 303 determines state data for one or more of the objects in the surrounding environment of the vehicle 300. State data describes a current state of an object (also referred to as features of the object). The state data for each object describes, for example, an estimate of the object's: current location (also referred to as position); current speed (also referred to as velocity); current acceleration; current heading; current orientation; size/shape/footprint (e.g., as represented by a bounding shape such as a bounding polygon or polyhedron); type/class (e.g., vehicle versus pedestrian versus bicycle versus other); yaw rate; distance from the vehicle 300; minimum path to interaction with the vehicle 300; minimum time duration to interaction with the vehicle 300; and/or other state information.

In some implementations, the perception system 303 can determine state data for each object over a number of iterations. In particular, the perception system 303 updates the state data for each object at each iteration. Thus, the perception system 303 detects and tracks objects, such as vehicles, that are proximate to the vehicle 300 over time.

The prediction system 304 is configured to predict one or more future positions for an object or objects in the environment surrounding the vehicle 300 (e.g., an object or objects detected by the perception system 303). The prediction system 304 generates prediction data associated with one or more of the objects detected by the perception system 303. In some examples, the prediction system 304 generates prediction data describing each of the respective objects detected by the prediction system 304.

Prediction data for an object can be indicative of one or more predicted future locations of the object. For example, the prediction system 304 may predict where the object will be located within the next 5 seconds, 30 seconds, 200 seconds, and so forth. Prediction data for an object may indicate a predicted trajectory (e.g., predicted path) for the object within the surrounding environment of the vehicle 300. For example, the predicted trajectory (e.g., path) can indicate a path along which the respective object is predicted to travel over time (and/or the speed at which the object is predicted to travel along the predicted path). The prediction system 304 generates prediction data for an object, for example, based on state data generated by the perception system 303. In some examples, the prediction system 304 also considers one or more vehicle poses generated by the localizer system 330 and/or map data 326.

In some examples, the prediction system 304 uses state data indicative of an object type or classification to predict a trajectory for the object. As an example, the prediction system 304 can use state data provided by the perception system 303 to determine that a particular object (e.g., an object classified as a vehicle) approaching an intersection and maneuvering into a left-turn lane intends to turn left. In such a situation, the prediction system 304 predicts a trajectory (e.g., path) corresponding to a left turn for the vehicle 300 such that the vehicle 300 turns left at the intersection. Similarly, the prediction system 304 determines predicted trajectories for other objects, such as bicycles, pedestrians, parked vehicles, and s forth. The prediction system 304 provides the predicted trajectories associated with the object(s) to the motion planning system 305.

In some implementations, the prediction system 304 is a goal-oriented prediction system 304 that generates one or more potential goals, selects one or more of the most likely potential goals, and develops one or more trajectories by which the object can achieve the one or more selected goals. For example, the prediction system 304 can include a scenario generation system that generates and/or scores the one or more goals for an object and a scenario development system that determines the one or more trajectories by which the object can achieve the goals. In some implementations, the prediction system 304 can include a machine-learned goal-scoring model, a machine-learned trajectory development model, and/or other machine-learned models.

The motion planning system 305 commands the vehicle controls based at least in part on the predicted trajectories associated with the objects within the surrounding environment of the vehicle 300, the state data for the objects provided by the perception system 303, vehicle poses provided by the localizer system 330, map data 326, and route data provided by the navigator system 313. Stated differently, given information about the current locations of objects and/or predicted trajectories of objects within the surrounding environment of the vehicle 300, the motion planning system 305 determines control commands for the vehicle 300 that best navigate the vehicle 300 along the route or route extension relative to the objects at such locations and their predicted trajectories on acceptable roadways.

In some implementations, the motion planning system 305 can also evaluate one or more cost functions and/or one or more reward functions for each of one or more candidate control commands or sets of control commands for the vehicle 300. Thus, given information about the current locations and/or predicted future locations/trajectories of objects, the motion planning system 305 can determine a total cost (e.g., a sum of the cost(s) and/or reward(s) provided by the cost function(s) and/or reward function(s)) of adhering to a particular candidate control command or set of control commands. The motion planning system 305 can select or determine a control command or set of control commands for the vehicle 300 based at least in part on the cost function(s) and the reward function(s). For example, the motion plan that minimizes the total cost can be selected or otherwise determined.

In some implementations, the motion planning system 305 can be configured to iteratively update the route for the vehicle 300 as new sensor data is obtained from one or more sensors 301. For example, as new sensor data is obtained from one or more sensors 301, the sensor data can be analyzed by the perception system 303, the prediction system 304, and the motion planning system 305 to determine the motion plan.

The motion planning system 305 can provide control commands to one or more vehicle controls 307. For example, the one or more vehicle controls 307 can include throttle systems, brake systems, steering systems, and other control systems, each of which can include various vehicle controls (e.g., actuators or other devices that control gas flow, steering, braking) to control the motion of the vehicle 300. The various vehicle controls 307 can include one or more controllers, control devices, motors, and/or processors.

The vehicle controls 307 can include a brake control module 320. The brake control module 320 is configured to receive a braking command and bring about a response by applying (or not applying) the vehicle brakes. In some examples, the brake control module 320 includes a primary system and a secondary system. The primary system receives braking commands and, in response, brakes the vehicle 300. The secondary system may be configured to determine a failure of the primary system to brake the vehicle 300 in response to receiving the braking command.

A steering control system 332 is configured to receive a steering command and bring about a response in the steering mechanism of the vehicle 300. The steering command is provided to a steering system to provide a steering input to steer the vehicle 300.

A lighting/auxiliary control module 336 receives a lighting or auxiliary command. In response, the lighting/auxiliary control module 336 controls a lighting and/or auxiliary system of the vehicle 300. Controlling a lighting system may include, for example, turning on, turning off, or otherwise modulating headlines, parking lights, running lights, and so forth. Controlling an auxiliary system may include, for example, modulating windshield wipers, a defroster, and so forth.

A throttle control system 334 is configured to receive a throttle command and bring about a response in the engine speed or other throttle mechanism of the vehicle. For example, the throttle control system 334 can instruct an engine and/or engine controller or other propulsion system component to control the engine or other propulsion system of the vehicle 300 to accelerate, decelerate, or remain at its current speed.

Each of the perception system 303, the prediction system 304, the motion planning system 305, the commander system 311, the navigator system 313, and the localizer system 330 can be included in or otherwise a part of a vehicle autonomy system 302 configured to control the vehicle 300 based at least in part on data obtained from one or more sensors 301. For example, data obtained by one or more sensors 301 can be analyzed by each of the perception system 303, the prediction system 304, and the motion planning system 305 in a consecutive fashion in order to control the vehicle 300. While FIG. 3 depicts elements suitable for use in a vehicle autonomy system according to example aspects of the present disclosure, one of ordinary skill in the art will recognize that other vehicle autonomy systems can be configured to control an autonomous vehicle based on sensor data.

The vehicle autonomy system 302 includes one or more computing devices, which may implement all or parts of the perception system 303, the prediction system 304, the motion planning system 305, and/or the localizer system 330.

FIGS. 4-7 are flowcharts illustrating example operations of the PDZ availability estimation system 106 in performing a method 400 for providing PDZ availability estimations, according to some embodiments. The method 400 may be embodied in computer-readable instructions for execution by a hardware component (e.g., a processor) such that the operations of the method 400 may be performed by the PDZ availability estimation system 106. Accordingly, the method 400 is described below, by way of example with reference thereto. However, it shall be appreciated that the method 400 may be deployed on various other hardware configurations and is not intended to be limited to deployment on the PDZ availability estimation system 106.

At operation 405, the PDZ availability estimation system 106 receives, via one of the APIs 109, a request for an estimate of PDZ availability at a specified location. The request is received from a vehicle autonomy system 302 of a vehicle (e.g., vehicle 102). The location may, for example, be a target location of the vehicle autonomy system 302. The request also includes an estimated time of arrival of the vehicle at the location.

At operation 410, the PDZ availability estimation system 106 estimates the PDZ availability at the specified location at the estimated time of arrival of the vehicle controlled by vehicle autonomy system 302 using the probabilistic model 107. As noted above, the estimated PDZ availability comprises a value that indicates a probability that a PDZ associated with the location will be available at the estimated time of arrival at the location. Hence, in estimating the PDZ availability, the PDZ availability estimation system 106 estimates a likelihood that a PDZ associated with the specified location will be unoccupied at the estimated time of arrival of the vehicle at the specified location. In some embodiments, the PDZ availability estimation system 106 may use the probabilistic model to estimate the PDZ availability based on real-time data comprising one or more indicia of PDZ availability (e.g., user generated reports of PDZ availability, sensor data from a second vehicle, or traffic information) at the location. Further details regarding the estimation of PDZ availability are discussed below in reference to FIGS. 5 and 7.

At operation 415, the PDZ availability estimation system 106 generates a response to the request based on the estimated PDZ availability. The request includes the estimated PDZ availability to indicate the probability that a PDZ associated with the location will be available at the estimated time of arrival at the location. The request may also include the individual estimates of availability of any one or more PDZs in the set of PDZs associated with the request location. In some embodiments, the response may further include a target PDZ selected based on a likelihood of availability and may further include a route to the target PDZ based on a current location of the vehicle controlled by the vehicle autonomy system 302. In some embodiments, the response may further include instructions that cause the vehicle autonomy system 302 to control the vehicle such that the vehicle travels to the target PDZ, for example, along a route determined by the PDZ availability estimation system 106. Further details regarding the generation of the response to the request are discussed below in reference to FIG. 7

At operation 420, the PDZ availability estimation system 106 transmits the response to the vehicle autonomy system 302 responsive to the request. Upon receiving the response, the vehicle autonomy system 302 may control the vehicle such that it travels to the target PDZ along a route determined by the vehicle autonomy system 302 or a route provided by the the PDZ availability estimation system 106.

Figure 5:
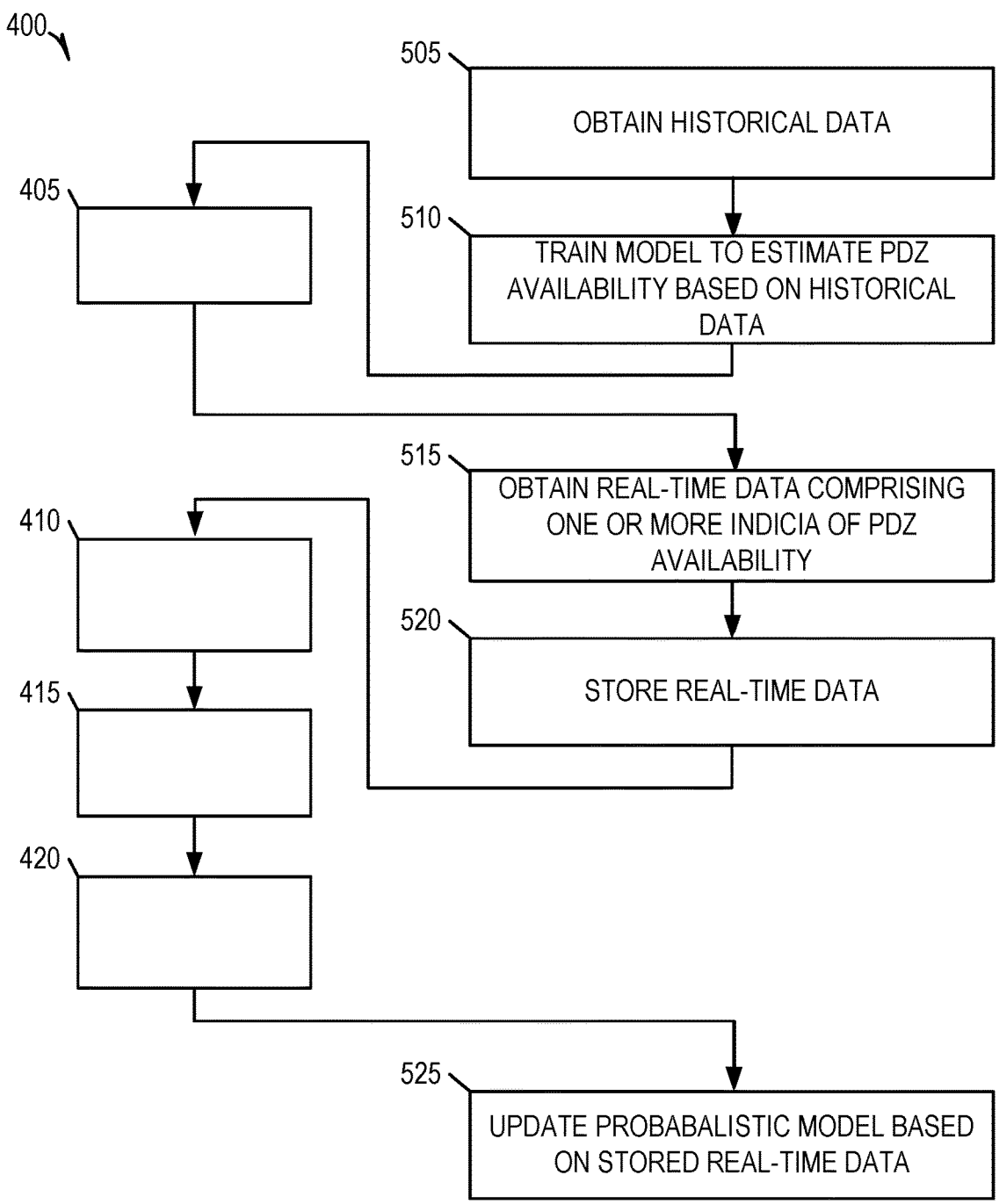

As shown in FIG. 5, the method 400 may, in some embodiments, include one or more of operations 505, 510, 515, 520, and 525. Consistent with these embodiments, any one or more of the operations 505 and 510 may be performed prior to (e.g., in an offline process) operation 405 where PDZ availability estimation system 106 receives a PDZ availability estimation request.

At operation 505, the PDZ availability estimation system 106 accesses historical data comprising historical indicia of PDZ availability. The PDZ availability estimation system 106 may access the historical data from one or more network accessible databases. The historical data may be obtained from a variety of data sources. For example, historical data may include user-generated information (e.g., user reports of an occupied or unoccupied PDZ); vehicle driving logs; vehicular sensor logs comprising image sensor data, Radar data, and Lidar data among others; traffic information; public transit schedules; parking restrictions; GPS data from one or more vehicles (e.g., known location of one or more stopped vehicles); and parking spot occupancy data obtained from parking meters or other parking sensors. Accordingly, the obtaining of historical data may include any one or more of: obtaining sensor data from a vehicle autonomy system; providing a prompt on a mobile computing device (e.g., via an application or push notifications) to confirm occupancy of a particular PDZ; obtaining a vehicle driving log; obtaining a vehicular sensor log; accessing real-time or historical traffic data; accessing a public transit schedule; accessing information related to parking restrictions; obtaining GPS data from a vehicle autonomy system; and obtaining parking spot occupancy data from a parking meter or sensor.

At operation 510, the PDZ availability estimation system 106 trains a probabilistic model to estimate PDZ availability based on the historical data. In some embodiments, the PDZ availability estimation system 106 may utilize a harmonic mean approach in which the PDZ availability estimation system 106 divides the historical data into multiple time slices and trains the probabilistic model based on a percentage of time a given PDZ is determined to be available at each time slice based on the historical data.

In some embodiments, in training the model, the PDZ availability estimation system 106 may employ one of many known machine learning algorithms to identify patterns in the historical data from which PDZ availability estimations may be determined. For example, the PDZ availability estimation system 106 may utilize models based on a multi-step time series forecast. As part of this process, the PDZ availability estimation system 106 may extract features (e.g., time of day, pedestrian density in the area, day of week, week of month, weather, other events in the city) to produce an estimation for the likelihood of a given PDZ being free or occupied.

Consistent with these embodiments, operations 515 and 520 may be performed prior to operation 410 where the PDZ availability estimation system 106 estimates the PDZ availability at the location at the estimated time of arrival. At operation 515, the PDZ availability estimation system 106 obtains real-time data comprising one or more indicia of PDZ availability at the location. As noted above, the PDZ availability estimation system 106 may use the probabilistic model to estimate PDZ availability at the location at the estimated time of arrival in view of the one or more indicia of PDZ availability included in the real-time data. The real-time data may, for example, include sensor data obtained from a second vehicle, real-time traffic information, or user generated reports of PDZ availability. The real-time data may be provided responsive to a request from the PDZ availability estimation system 106 or may be submitted independently to the PDZ availability estimation system 106 by the second vehicle via one of the APIs 109.

Figure 6:
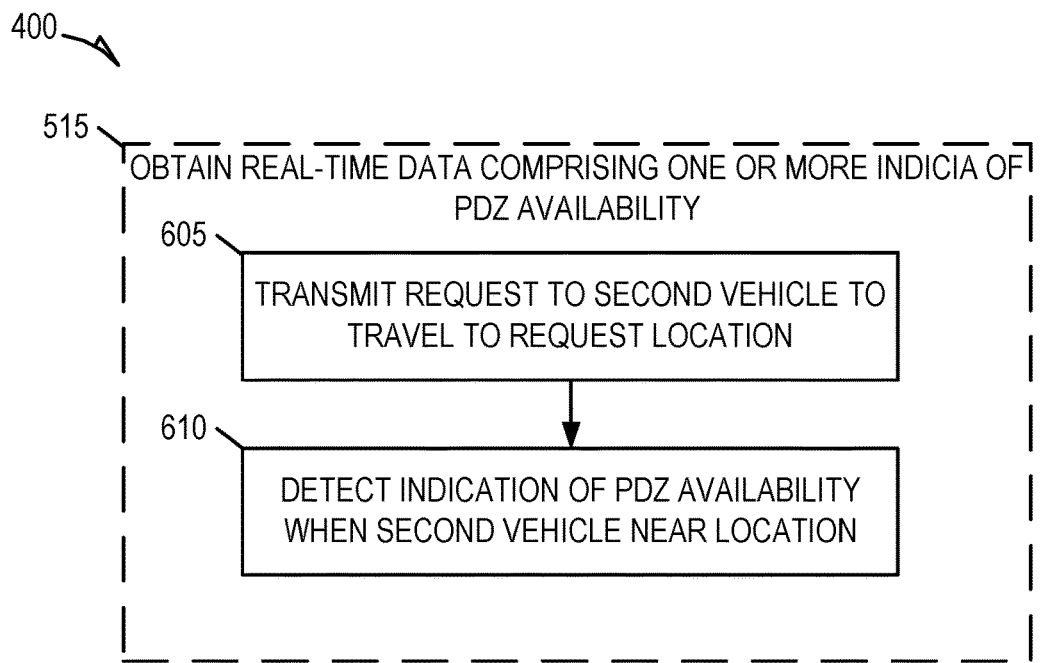

As an example, as shown in FIG. 6, the operation 515 may, in some embodiments, include operations 605 and 610. At operation 605, the PDZ availability estimation system 106 transmits a request to a second vehicle to travel to the request location. In some embodiments, the request includes a command that, when received by a vehicle autonomy system (e.g., vehicle autonomy system 104) of the second vehicle, causes the vehicle autonomy system to control operation of the second vehicle such that the second vehicle travels to the request location.

In some embodiments, the request includes an option to accept or reject the request. Consistent with these embodiments, the vehicle autonomy system of the second vehicle decides whether to travel to the request location. The vehicle autonomy system of the second vehicle may decide whether to travel to the request location based on user input, input from an external system, or based on other criteria.

In some embodiments, the request may further include a monetary reward for the second vehicle to travel to the request location. In embodiments in which the request also includes an option to accept or deny the request, the monetary reward may serve as an incentive for the second vehicle to accept the request.

At operation 610, the PDZ availability estimation system 106 detects an indication of PDZ availability when the second vehicle is near the request location. In some embodiments, the indication of PDZ availability may be based on sensor data obtained from the second vehicle. For example, the PDZ availability estimation system 106 may detect an available or occupied PDZ based on an analysis of image data produced by one or more image sensors, point cloud data produced by one or more Lidar systems, or Radar data produced by one or more Radar systems.

In some embodiments, the indication of PDZ availability may be based on one or more user generated reports of PDZ availability. For example, the PDZ availability estimation system 106 may provide a prompt on a display device within the second vehicle to confirm whether a particular PDZ is available. The display device may correspond to a mobile device of a user or a display device of the second vehicle. Consistent with these embodiments, a user's response to the prompt (also referred to as a "user report of PDZ availability") corresponds to the indication.

Returning to FIG. 5, at operation 520, the PDZ availability estimation system 106 stores the real-time data for subsequent use in updating the probabilistic model. The PDZ availability estimation system 106 may store the real-time data in one or more network accessible databases. For example, at operation 525, the PDZ availability estimation system 106 updates the probabilistic model 107 based on the stored real-time data. As shown, the operation 525 may be performed subsequent to operation 420. For example, the PDZ availability estimation system 106 may use the real-time data to update the probabilistic model 107 as part of batch update process performed at a routine interval (e.g., every 24 hours). In some embodiments, the PDZ availability estimation system 106 waits until a threshold number of PDZ availability indicia at a particular location are received before updating the probabilistic model 107. In some embodiments, the PDZ availability estimation system 106 may update the probabilistic model 107 as the real-time data is obtained.

Figure 7:
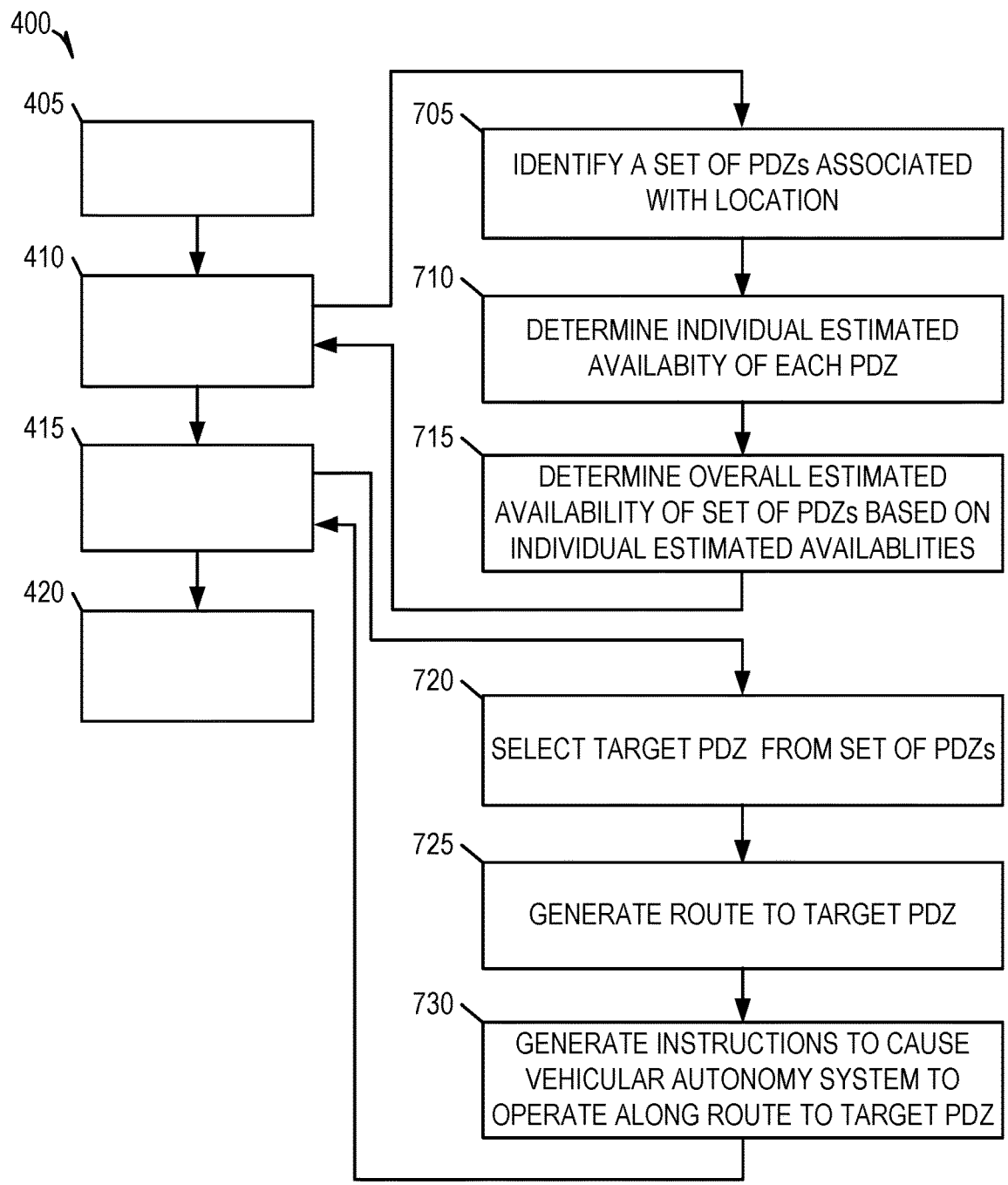

As shown in FIG. 7, the method 400 may, in some embodiments, include any one or more of operations 705, 710, 715, 720, 725, and 730. Consistent with these embodiments, any one or more of the operations 705, 710, and 715 may be performed as part of (e.g., as a sub-routine or sub-operations) the operation 410 where PDZ availability estimation system 106 estimates the PDZ availability at the location at the estimated time of arrival. At operation 705, the PDZ availability estimation system 106 identifies a set of PDZs associated with the request location. The PDZ availability estimation system 106 may identify a PDZ associated with the request location based on a distance between the PDZ and the request location. For example, the PDZ availability estimation system 106 may identify a PDZ associated with the request location based on a distance between the PDZ and the request location satisfying a threshold distance criteria. The PDZ availability estimation system 106 may determine the distance based on map data 226.

In some embodiments, the PDZ availability estimation system 106 may maintain a look-up table that identifies PDZs with pre-determined associations with particular locations. Consistent with these embodiments, the PDZ availability estimation system 106 may use the look-up table to identify the set of PDZ associated with the request location.

At operation 710, the PDZ availability estimation system 106 determines an individual estimated availability of each PDZ in the set of PDZs associated with the request location using the probabilistic model. The estimated availability of a PDZ indicates a likelihood that the PDZ will be available (unoccupied) at an estimated time of arrival of the vehicle. The estimated availability of each PDZ may be based on one or more real-time indicia of PDZ availability.

In some embodiments, the estimated time of arrival at each PDZ may be different and may differ from the estimated time of arrival of the vehicle at the request location. Consistent with these embodiments, PDZ availability estimation system 106 may determine an estimated time of arrival of the vehicle at each PDZ and use respective estimated times of arrival in estimating the availability of the corresponding PDZ. The PDZ availability estimation system 106 may determine the estimated time of arrival at a given PDZ based on a current location of the vehicle, a distance between the current location of the vehicle and the PDZ, traffic information, legal restrictions such as speed limits, operational capabilities of the vehicle, and any obstacles in a route from the current location of the vehicle and the PDZ.

In some embodiments, the PDZ availability estimation system 106 determines the estimated time of arrival at a given PDZ based on a route of the vehicle. The route may be determined by PDZ availability estimation system 106 or may be determined by the vehicle autonomy system 302 of the vehicle. As an example, PDZ availability estimation system 106 can estimate the projected speed of the vehicle over the remainder of its route. The projected speed of the second vehicle can be based on the speed limit of the roadways to be traversed to reach the target location, traffic conditions on the roadways to be traversed to reach the target location, and/or other suitable factors.

At operation 715, the PDZ availability estimation system 106 determines an overall estimated availability of the set of PDZs associated with the request location at the estimated time of arrival based on the individual availability estimates. In an example, the PDZ availability estimation system 106 determines the overall estimated availability of the set of PDZs based on the maximum individual estimated availability of the set of PDZs. In another example, the PDZ availability estimation system 106 determines the overall estimated availability of the set of PDZs based on a combination of the individual estimated availabilities such as an average of all individual estimated availabilities. The overall estimated availability of the set of PDZs corresponds to the estimated PDZ availability at the location at the estimated time of arrival.

At operation 720, the PDZ availability estimation system 106 selects a target PDZ from the set of PDZs associated with the request location. The PDZ availability estimation system 106 selects the target PDZ from the set of PDZs based on any one or more of the individual estimates of availabilities of the set of PDZs, a proximity to other PDZs, an estimated time of arrival at the PDZ, and operational capabilities of the vehicle. In a first example, PDZ availability estimation system 106 selects the PDZ having the highest likelihood of being available. In a second example, rather than selecting a first PDZ corresponding to the highest likelihood of being available, the PDZ availability estimation system 106 selects a second PDZ that has a lower likelihood of being available, but that is near (e.g., within a predetermined threshold distance) a third PDZ that has a similar likelihood of availability. In a third example, the PDZ availability estimation system 106 may determine, based on the operational capabilities, that the vehicle is incapable of traveling to a first PDZ corresponding to the highest likelihood of being available and instead selects a second PDZ that has the second highest likelihood of being available and to which the vehicle is capable of traveling. In a fourth example, the PDZ availability estimation system 106 may select a first PDZ that has a lower likelihood of availability than a second PDZ with the highest likelihood of availability but an estimated time of arrival that is before the estimated time of arrival of the second PDZ.

At operation 725, the PDZ availability estimation system 106 generates a route to the target PDZ using map data. The route connects a current location of the vehicle to the target PDZ. The PDZ availability estimation system 106 generates the route based on the current location of the vehicle and operational capabilities of the vehicle. In some embodiments, the PDZ availability estimation system 106 may generate the route based on a current route of the vehicle.

For example, the PDZ availability estimation system 106 may reduce or extend a current route of the vehicle.

At operation 730, the PDZ availability estimation system 106 generates computer-readable instructions to cause the vehicular autonomy system 302 to operate the vehicle along the route to the target PDZ. It shall be appreciated that although the response may, in some embodiments, include the target PDZ, the generated route, and the computer-readable instructions, in other embodiments, the response may not include one or more of the target PDZ, the generated route, and the computer-readable instructions. For example, in some embodiments, the request includes the target PDZ along with a suggested route, and the vehicular autonomy system 302 determines whether to use the suggested route or generate a route of its own. As another example, the response may include only the target PDZ, and it is up to the vehicular autonomy system 302 to generate the route to the target PDZ. As yet another example, the response may only include estimated availabilities of one or more PDZs and it is up to the vehicular autonomy system 302 to determine which PDZ to travel to and to generate the route to the selected PDZ.

Figure 8:
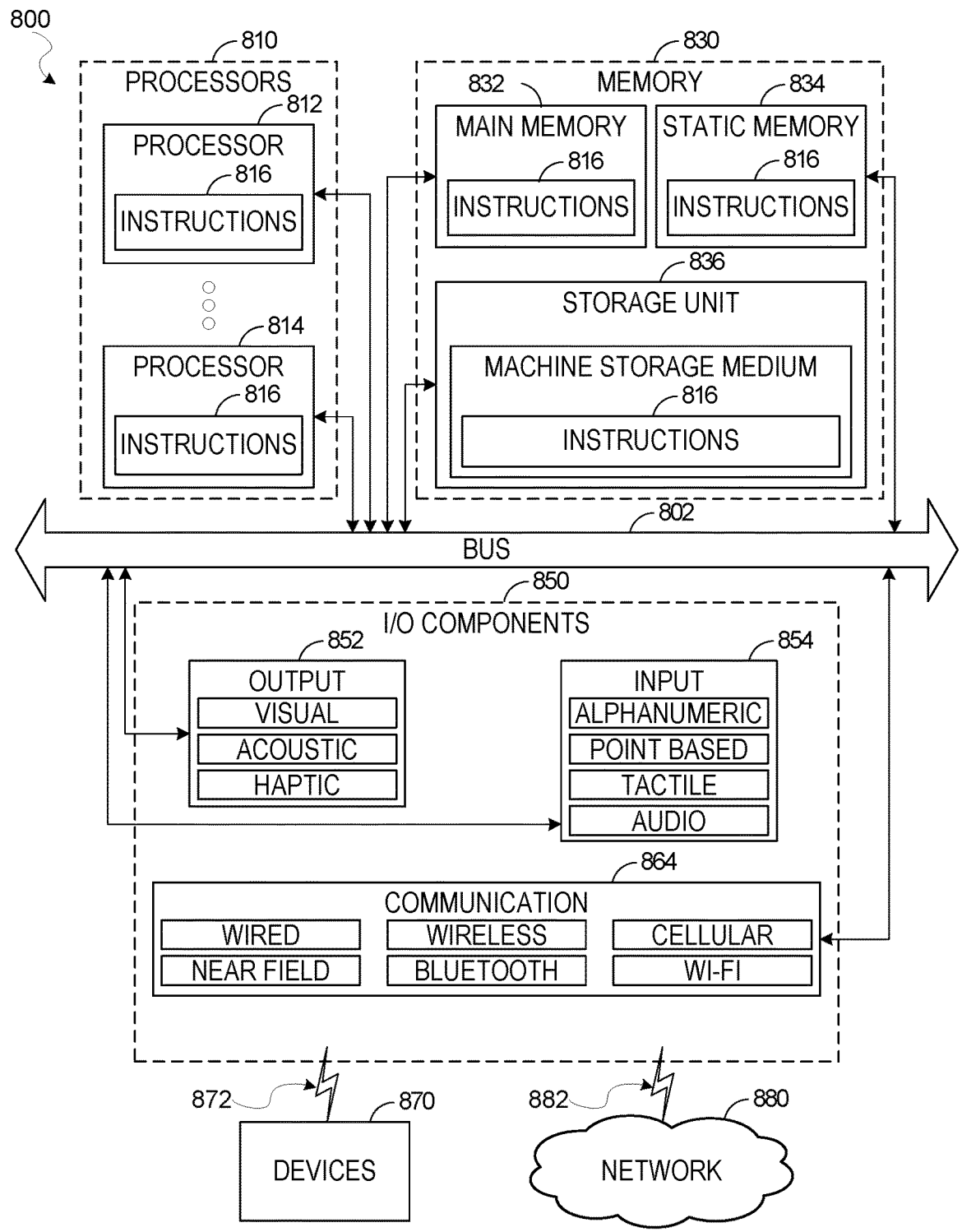
FIG. 8 is a diagrammatic representation of a machine in the example form of a computer system within which a set of instructions for causing the machine to perform any one or more of the methodologies discussed herein may be executed.

FIG. 8 illustrates a diagrammatic representation of a machine 800 in the form of a computer system within which a set of instructions may be executed for causing the machine 800 to perform any one or more of the methodologies discussed herein, according to an example embodiment. Specifically, FIG. 8 shows a diagrammatic representation of the machine 800 in the example form of a computer system, within which instructions 816 (e.g., software, a program, an application, an applet, an app, or other executable code) for causing the machine 800 to perform any one or more of the methodologies discussed herein may be executed. For example, the instructions 816 may cause the machine 800 to execute the method 400. In this way, the instructions 816 transform a general, non-programmed machine into a particular machine 800, such as the vehicle autonomy system 104, that is specially configured to carry out the described and illustrated functions in the manner described here. In alternative embodiments, the machine 800 operates as a standalone device or may be coupled (e.g., networked) to other machines. In a networked deployment, the machine 800 may operate in the capacity of a server machine or a client machine in a server-client network environment, or as a peer machine in a peer-to-peer (or distributed) network environment. The machine 800 may comprise, but not be limited to, a server computer, a client computer, a personal computer (PC), a tablet computer, a laptop computer, a netbook, a smart phone, a mobile device, a network router, a network switch, a network bridge, or any machine capable of executing the instructions 816, sequentially or otherwise, that specify actions to be taken by the machine 800. Further, while only a single machine 800 is illustrated, the term "machine" shall also be taken to include a collection of machines 800 that individually or jointly execute the instructions 816 to perform any one or more of the methodologies discussed herein.

The machine 800 may include processors 810, memory 830, and input/output (I/O) components 850, which may be configured to communicate with each other such as via a bus 802. In an example embodiment, the processors 810 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 812 and a processor 814 that may execute the instructions 816. The term "processor" is intended to include multi-core processors 810 that may comprise two or more independent processors (sometimes referred to as "cores") that may execute instructions 816 contemporaneously. Although FIG. 9 shows multiple processors 810, the machine 800 may include a single processor with a single core, a single processor with multiple cores (e.g., a multi-core processor), multiple processors with a single core, multiple processors with multiple cores, or any combination thereof.

The memory 830 may include a main memory 832, a static memory 834, and a storage unit 836, both accessible to the processors 810 such as via the bus 802. The main memory 832, the static memory 834, and the storage unit 836 store the instructions 816 embodying any one or more of the methodologies or functions described herein. The instructions 816 may also reside, completely or partially, within the main memory 832, within the static memory 834, within the storage unit 836, within at least one of the processors 810 (e.g., within the processor's cache memory), or any suitable combination thereof, during execution thereof by the machine 800.

The I/O components 850 may include components to receive input, provide output, produce output, transmit information, exchange information, capture measurements, and so on. The specific I/O components 850 that are included in a particular machine 800 will depend on the type of machine. For example, portable machines such as mobile phones will likely include a touch input device or other such input mechanisms, while a headless server machine will likely not include such a touch input device. It will be appreciated that the I/O components 850 may include many other components that are not shown in FIG. 9. The I/O components 850 are grouped according to functionality merely for simplifying the following discussion and the grouping is in no way limiting. In various example embodiments, the I/O components 850 may include output components 852 and input components 854. The output components 852 may include visual components (e.g., a display such as a plasma display panel (PDP), a light emitting diode (LED) display, a liquid crystal display (LCD), a projector, or a cathode ray tube (CRT)), acoustic components (e.g., speakers), other signal generators, and so forth. The input components 854 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

Communication may be implemented using a wide variety of technologies. The I/O components 850 may include communication components 864 operable to couple the machine 800 to a network 880 or devices 870 via a coupling 882 and a coupling 872, respectively. For example, the communication components 864 may include a network interface component or another suitable device to interface with the network 880. In further examples, the communication components 864 may include wired communication components, wireless communication components, cellular communication components, and other communication components to provide communication via other modalities. The devices 870 may be another machine or any of a wide variety of peripheral devices (e.g., a peripheral device coupled via a universal serial bus (USB)).

Executable Instructions and Machine Storage Medium

The various memories (e.g., 830, 832, 834, and/or memory of the processor(s) 810) and/or the storage unit 836 may store one or more sets of instructions 816 and data structures (e.g., software) embodying or utilized by any one or more of the methodologies or functions described herein. These instructions, when executed by the processor(s) 810, cause various operations to implement the disclosed embodiments.

As used herein, the terms "machine-storage medium," "device-storage medium," and "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate arrays (FPGAs), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

Transmission Medium

In various example embodiments, one or more portions of the network 880 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 880 or a portion of the network 880 may include a wireless or cellular network, and the coupling 882 may be a Code Division Multiple Access (CDMA) connection, a Global System for Mobile communications (GSM) connection, or another type of cellular or wireless coupling. In this example, the coupling 982 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long Term Evolution (LTE) standard, others defined by various standard-setting organizations, other long-range protocols, or other data transfer technology.

The instructions 816 may be transmitted or received over the network 880 using a transmission medium via a network interface device (e.g., a network interface component included in the communication components 864) and utilizing any one of a number of well-known transfer protocols (e.g., hypertext transfer protocol (HTTP)). Similarly, the instructions 816 may be transmitted or received using a transmission medium via the coupling 872 (e.g., a peer-to-peer coupling) to the devices 870. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 816 for execution by the machine 800, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

Computer-Readable Medium

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

The various operations of example methods described herein may be performed, at least partially, by one or more processors that are temporarily configured (e.g., by software) or permanently configured to perform the relevant operations. Similarly, the methods described herein may be at least partially processor-implemented. For example, at least some of the operations of a method may be performed by one or more processors. The performance of certain of the operations may be distributed among the one or more processors, not only residing within a single machine, but deployed across a number of machines. In some example embodiments, the processor or processors may be located in a single location (e.g., within a home environment, an office environment, or a server farm), while in other embodiments the processors may be distributed across a number of locations.

Although the embodiments of the present disclosure have been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent, to those of skill in the art, upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim is still deemed to fall within the scope of that claim.

What is claimed is:

1. A system comprising:
   at least one processor of a machine; and
   a memory storing instructions that cause the at least one processor to perform operations comprising:
   receiving, from a vehicular autonomy system of a vehicle, a request for vehicular pick-up/drop off (PDZ) availability at a location, the request specifying an estimated time of arrival at the location;
   estimating, using a probabilistic model, the PDZ availability at the location at the estimated time of arrival, the probabilistic model comprising a machine learning model that is trained based on historical training data to extract one or more features from the historical training data and compute a probabilistic estimation of a given PDZ being free or occupied based on the one or more features extracted from the historical training data;
   generating a response to the request based on the estimated PDZ availability;
   transmitting, to the vehicular autonomy system, the response to the request, the response indicating the estimated PDZ availability; and
   causing the vehicle to navigate to the PDZ at the location according a route.

2. The system of claim 1, wherein the historical training data comprises global position system data from one or more vehicles, wherein the estimating of the PDZ availability at the location comprises:
   identifying a set of PDZs associated with the location; and
   determining, using the probabilistic model, an estimated availability of the set of PDZs at the estimated time of arrival.

3. The system of claim 2, wherein the determining the estimated availability of the set of PDZs at the estimated time of arrival comprises:
   determining, using the probabilistic model, an individual estimated availability of each PDZ in the set of PDZs; and
   determining the estimated availability of the set of PDZs based on the individual estimated availability of each PDZ in the set of PDZs.

4. The system of claim 2, wherein the generating of the response comprises:
   selecting a target PDZ from the set of PDZs based in part on the estimated availability of the target PDZ in the set of PDZs, wherein the response indicates the target PDZ.

5. The system of claim 4, wherein the selecting of the target PDZ is further based on a proximity of the target PDZ to at least one other PDZ.

6. The system of claim 4, wherein the generating of the response further comprises:
   generating a set of instructions that, when received by the vehicular autonomy system, cause the vehicle autonomy system to control operation of a vehicle such that the vehicle navigates to the target PDZ.

7. The system of claim 4, wherein the generating of the response further comprises:
   generating a route for the vehicle to the target PDZ based on a current location and target location of the vehicle.

8. The system of claim 1, wherein the operations further comprise:
   obtaining data comprising one or more indicia of PDZ availability at the location;
   wherein the estimating of the PDZ availability at the location at the estimated time of arrival is further based on the one or more indicia of PDZ availability at the location.

9. The system of claim 8, wherein:
   the vehicular autonomy system is a first vehicular autonomy system of a first vehicle;
   the obtaining of the data comprises:
   transmitting a request to a second vehicular autonomy system of a second vehicle that causes the second vehicle to travel to the location; and
   detecting an indication of the PDZ availability at the location when the second vehicle is near the location.

10. The system of claim 9, wherein:
    the obtaining of the data further comprises:
    causing display, on a display device inside the second vehicle, of a prompt for an occupant of the second vehicle to provide an indication of the PDZ availability at the location; and
    receiving a response to the prompt comprising the indication of the PDZ availability specified by the occupant of the second vehicle.

11. The system of claim 8, wherein:
    the vehicular autonomy system is a first vehicular autonomy system of a first vehicle;
    the obtaining of the data comprises accessing sensor data generated by one or more sensors of a second vehicular autonomy system of a second vehicle.

12. The system of claim 8, further comprising:
    updating the probabilistic model based on the more indicia of PDZ availability at the location.

13. The system of claim 1, further comprising:
    wherein the probabilistic model is trained based on the historical training data that comprises one or more of: user-generated information; vehicle driving logs; vehicular sensor logs; traffic information; public transit schedules; parking restrictions; global position system data from one or more vehicles; and parking spot occupancy data obtained from parking sensors.

14. A computer-implemented method comprising:
    receiving, from a vehicular autonomy system of a vehicle, a request for vehicular pick-up/drop off (PDZ) availability at a location, the request specifying an estimated time of arrival at the location;

estimating, using a probabilistic model, the PDZ availability at the location at the estimated time of arrival, the probabilistic model comprising a machine learning model that is trained based on historical training data to extract one or more features from the historical training data and compute a probabilistic estimation of a given PDZ being free or occupied based on the one or more features extracted from the historical training data;

generating, using one or more processors of a machine, a response to the request based on the estimated PDZ availability;

transmitting, to the vehicular autonomy system, the response to the request, the response indicating the estimated PDZ availability; and causing the vehicle to navigate to the PDZ at the location according a route.

15. The computer-implemented method of claim 14, wherein the estimating of the PDZ availability at the location comprises:
identifying a set of PDZs associated with the location; and
determining, using the probabilistic model, an individual estimated availability of each PDZ in the set of PDZs; and
determining the estimated availability of the set of PDZs based on the individual estimated availability of each PDZ in the set of PDZs.

16. The computer-implemented method of claim 15, wherein the generating of the response comprises:
selecting a target PDZ from the set of PDZs based in part on the individual estimated availability of the target PDZ, wherein the response indicates the target PDZ.

17. The computer-implemented method of claim 16, wherein the generating of the response further comprises:
generating a route for the vehicle to the target PDZ based on a current location and target location of the vehicle; and
generating a set of instructions that, when received by the vehicular autonomy system, cause the vehicle autonomy system to control operation of a vehicle such that the vehicle travels to along the route to the target PDZ.

18. The computer-implemented method of claim 14, further comprising:

obtaining data comprising one or more indicia of PDZ availability at the location; and
updating the probabilistic model based on the more indicia of PDZ availability at the location;
wherein the estimating of the PDZ availability at the location at the estimated time of arrival is further based on the one or more indicia of PDZ availability at the location.

19. The computer-implemented method of claim 18, wherein:
the vehicular autonomy system is a first vehicular autonomy system of a first vehicle;
the obtaining of the data comprises:
transmitting a request to a second vehicular autonomy system of a second vehicle that causes the second vehicle to travel to the location; and
detecting an indication of the PDZ availability at the location when the second vehicle is near the location.

20. A tangible computer-readable medium storing instructions that, when executed by one or more processors of a machine, cause the one or more processors of the machine to perform operations comprising:
receiving, from a vehicular autonomy system of a vehicle, a request for vehicular pick-up/drop off (PDZ) availability at a location, the request specifying an estimated time of arrival at the location;
estimating, using a probabilistic model, the PDZ availability at the location at the estimated time of arrival, the probabilistic model comprising a machine learning model that is trained based on historical training data to extract one or more features from the historical training data and compute a probabilistic estimation of a given PDZ being free or occupied based on the one or more features extracted from the historical training data;
generating a response to the request based on the estimated PDZ availability;
transmitting, to the vehicular autonomy system, the response to the request, the response indicating the estimated PDZ availability; and
causing the vehicle to navigate to the PDZ at the location according a route.

* * * * *